(12) United States Patent
Chen et al.

(10) Patent No.: US 7,364,321 B2
(45) Date of Patent: Apr. 29, 2008

(54) BACKLIGHT MODULE AND LAMP HOLDER THEREOF

(75) Inventors: Chung-Chuan Chen, Nantou (TW); Nan-Ching Lee, Kaohsiung (TW); Fei-Ling Chou, Jhudong Township, Hsinchu County (TW)

(73) Assignee: Au Optronics Corp., Hsinchu (TW)

( * ) Notice: Subject to any disclaimer, the term of this patent is extended or adjusted under 35 U.S.C. 154(b) by 216 days.

(21) Appl. No.: 11/190,157

(22) Filed: Jul. 26, 2005

(65) Prior Publication Data

US 2006/0268542 A1    Nov. 30, 2006

(30) Foreign Application Priority Data

May 26, 2005    (TW) .................................. 94117223

(51) Int. Cl.
*F21S 4/00* (2006.01)

(52) U.S. Cl. ........................ 362/225; 362/217; 362/382

(58) Field of Classification Search ........ 362/632–634, 362/613–614, 561, 217, 225, 260, 370, 416, 362/426, 238, 249, 365, 382, 396, 429–431, 362/435, 457; 248/221.12, 222.41, 214, 248/229.1, 229.16, 227.4, 230.1, 231.8, 68.1, 248/346.03, 346.5; 349/58–60, 70
See application file for complete search history.

(56) References Cited

U.S. PATENT DOCUMENTS

| | | | | |
|---|---|---|---|---|
| 1,300,860 A | * | 4/1919 | Otte | ........................... 362/426 |
| 2,613,051 A | * | 10/1952 | Baurn | ........................... 248/50 |
| 4,566,660 A | * | 1/1986 | Anscher et al. | ............. 248/74.2 |
| 4,997,147 A | * | 3/1991 | Velke et al. | ................... 248/50 |
| 5,143,331 A | * | 9/1992 | Robert | ....................... 248/27.1 |
| 5,420,762 A | * | 5/1995 | Lewis | .......................... 362/549 |
| 7,172,330 B2 | * | 2/2007 | Lee et al. | .................... 362/634 |

FOREIGN PATENT DOCUMENTS

| | | |
|---|---|---|
| CN | 2004150010 | 5/2004 |
| CN | 1588205 | 3/2005 |
| JP | 2001-210126 | 8/2001 |
| JP | 2001210126 | 8/2001 |
| KR | 20040078255 | 9/2004 |
| KR | 20040100764 | 12/2004 |

OTHER PUBLICATIONS

CN Office Action mailed Mar. 30, 2007.

* cited by examiner

*Primary Examiner*—Jong-Suk (James) Lee
*Assistant Examiner*—Robert May
(74) *Attorney, Agent, or Firm*—Thomas, Kayden, Horstemeyer & Risley

(57) ABSTRACT

A backlight module and a lamp holder thereof. The backlight module includes a plurality of lamps and a lamp holder. The lamp holder includes a plurality of supporting portions and a plurality of holding portions. Each lamp is disposed on the corresponding supporting portion. Each holding portion includes two rods to fix the lamp at the supporting portion.

18 Claims, 6 Drawing Sheets

BACKLIGHT MODULE AND LAMP HOLDER THEREOF

BACKGROUND

The invention relates to a backlight module and a lamp holder thereof, and in particular, to a lamp holder with reduced area contacting a lamp to be held.

In a backlight module of a liquid crystal display, lamps are typically held by lamp holders. FIGS. 1a and 1b depict a backlight module 200 and lamp holders 220 thereof as disclosed in Japan published patent application No. 2001-210126. The backlight module 200 further comprises a plurality of lamps 210 and two supports 240. Each lamp 210 is held by the lamp holder 220 and the supports 240. The lamp holders 220 are disposed on a reflector plate 230.

The lamp holder 220 is a convenient means of holding the lamp 210 in place. The lamp 210 is, however, fully surrounded by the lamp holder 220 as shown in FIG. 1b, thus, light generated thereby is completely obstructed. Furthermore, due to this arrangement, the heat generated by the lamp 210 is easily absorbed by the lamp holder 220, generating a temperature-differential. As a result, the area, contacting the lamp holder 220, of the lamp 210 is darker than other areas.

SUMMARY

Lamp holders are provided. An exemplary embodiment of a lamp holder, for supporting a lamp, comprises a base, a supporting portion, and a holding portion. The supporting portion is disposed on the base. The lamp is disposed on the supporting portion. The holding portion is disposed on the base, and comprises two rods which are located at two sides of the supporting portion to fix the lamp on the supporting portion.

Furthermore, each rod comprises a hook abutting the lamp to fix the lamp. The hook is substantially located at a center of the rod, and extends toward the base.

Moreover, the rods are staggered. The supporting portion comprises a cambered surface contacting the lamp. The curvature of the cambered surface is less than the curvature of the lamp. The base comprises a plurality of notches. Both the supporting portion and the holding portion are integrally formed on the base.

Backlight modules are provided. An exemplary embodiment of a backlight module comprises a plurality of lamps and a lamp holder. The lamp holder comprises a plurality of fixing members. Each fixing member comprises a supporting portion and a holding portion. The supporting portion is for supporting the corresponding lamp. The holding portion comprises two rods located at two sides of the supporting portion to fix the lamp on the supporting portion.

Furthermore, the backlight module comprises a back plate with a hole. The lamp holder comprises an engaging assembly combined with the hole to fix the lamp holder at the back plate. The hole comprises a small-radius portion and a large-radius portion. The engaging assembly enters the hole via the large-radius portion and engages the hole at the small-radius portion. The engaging assembly comprises a shaft and a cantilever beam abutting the small-radius portion respectively when the engaging assembly is engaged with the hole at the small-radius portion.

Moreover, the lamp holder is integrally formed into a single piece. The number of the lamp holder may be plural, and the lamp holders are not aligned.

DESCRIPTION OF THE DRAWINGS

The invention can be more fully understood by reading the subsequent detailed description and examples with references made to the accompanying drawings, wherein:

FIG. 1b is a schematic view of a lamp holder in FIG. 1a;

FIGS. 3a and 3b are schematic views of a lamp holder in FIG. 2a;

FIG. 3c is a schematic view of a lamp and a supporting portion of the lamp holder in FIG. 3a;

FIG. 4b is a top view of the lamp holder in FIG. 4a; and

DETAILED DESCRIPTION

Figure 1A:
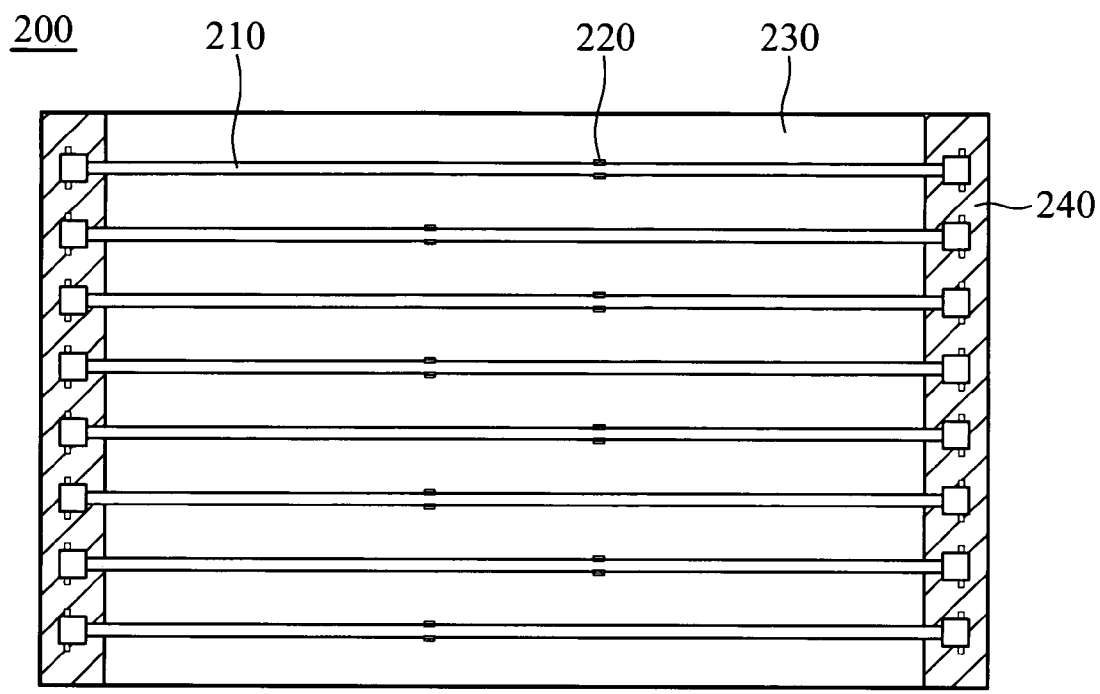
FIG. 1a is a schematic view of a conventional backlight module as disclosed in Japan published patent application No. 2001-210126.
Figure 1B:
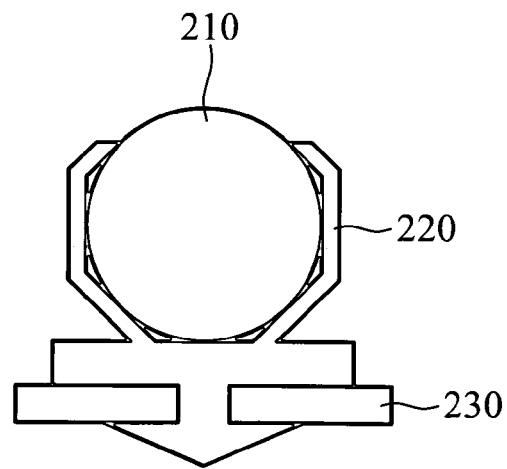
Figure 2A:
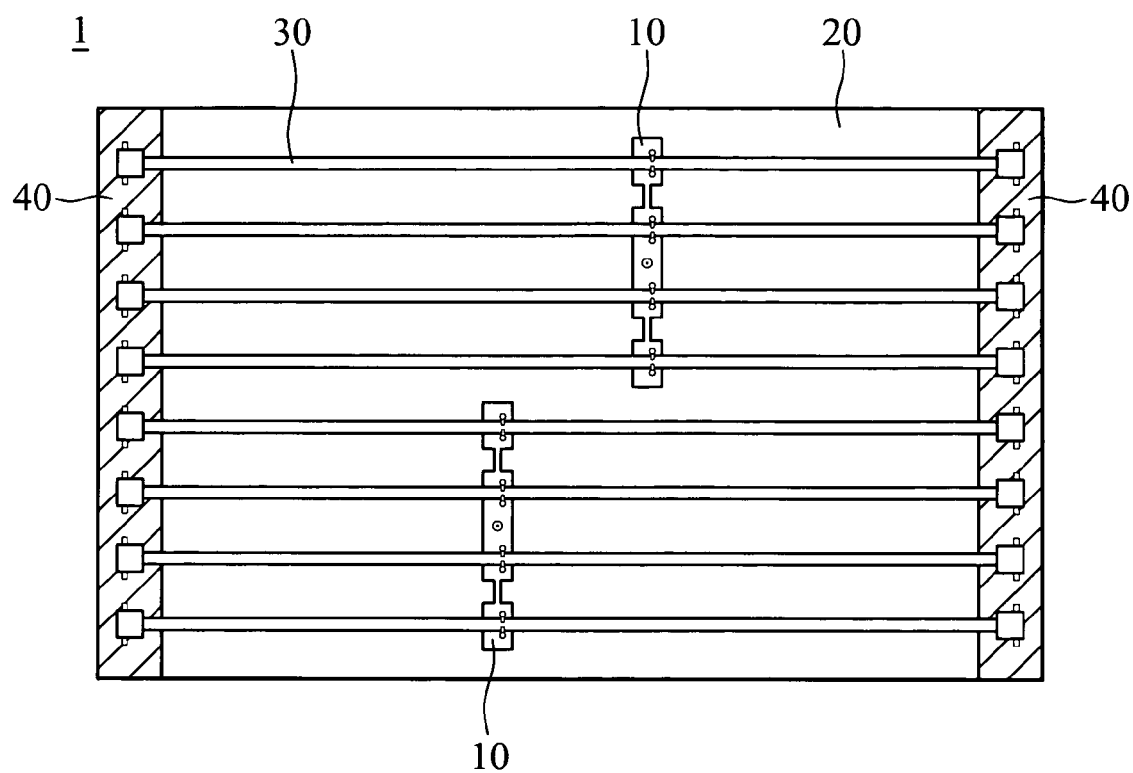
FIG. 2a is a schematic view of a backlight module according to an embodiment of the invention.

Referring to FIG. 2a, an embodiment of a backlight module 1 comprises two lamp holders 10, a back plate 20, a plurality of lamps 30, and two supports 40. Note that the backlight module 1 further comprises other devices, such as a diffuser plate and optical films. Since other devices of the backlight module 1 are the same as the conventional module, its detailed description is omitted. Additionally, the supports 40 support both ends of the lamps 30.

Figure 2B:
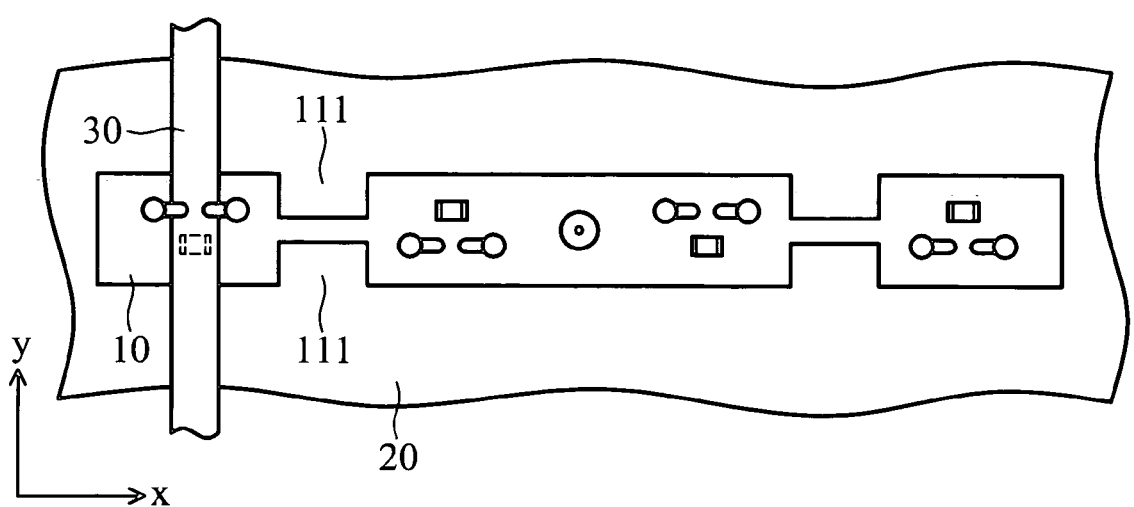
FIG. 2b is a partial enlarged view of FIG. 2a, wherein only one lamp is shown.
Figure 3A:
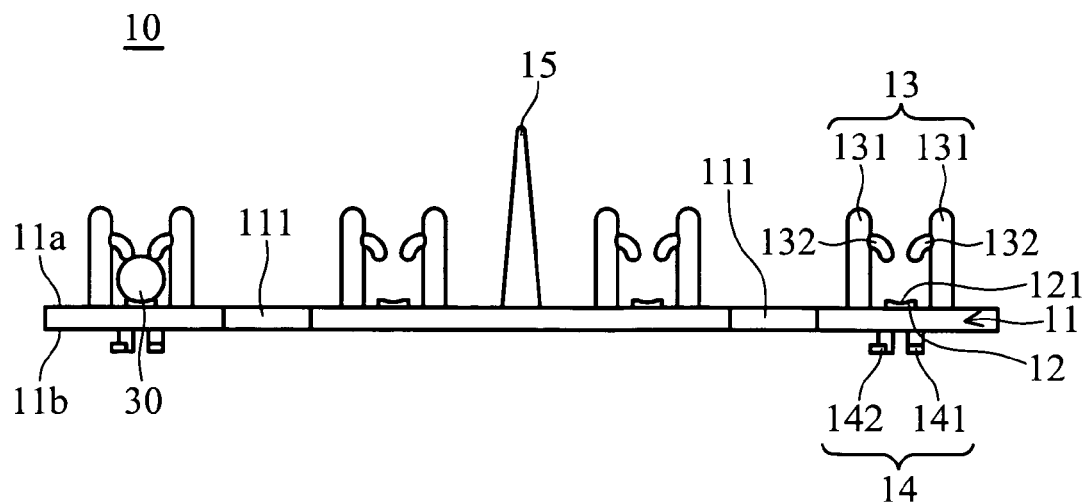
Figure 3B:
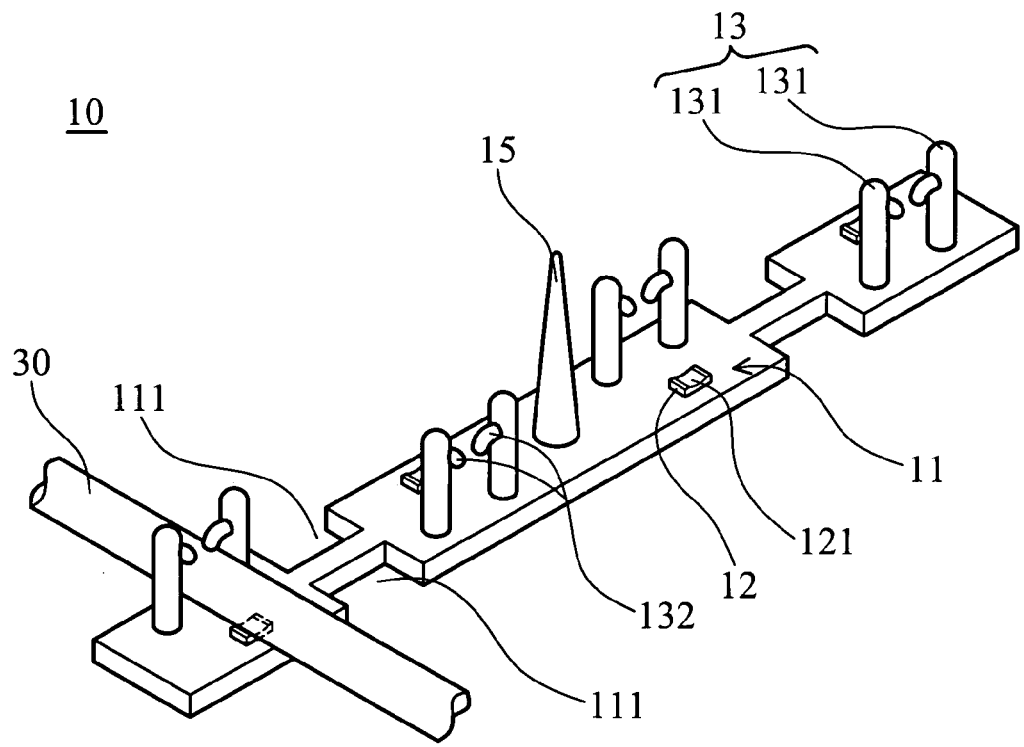

Referring to FIGS. 2b, 3a, and 3b, each lamp holder 10 supports a plurality of lamps 30. In FIG. 2a, four lamps 30 are supported by one lamp holder 10. Each lamp holder 10 comprises a base 11, a plurality of supporting portions 13, a plurality of holding portions 13, and two engaging assemblies 14. Note that each supporting portion 12 and the corresponding holding portion 13 constitute a fixing member. Note that the number of the lamp holders 10 is two in FIG. 2a, however, it is not limited to this, and may be adjusted based on the number of the lamps 30.

Additionally, each lamp holder 10 is preferably not aligned with other lamp holders to obtain better reflection. Similarly, the base 11 comprises a plurality of notches 111 to reduce the occupied area of the lamp holder 10, thus obtaining better reflection. Additionally, the number of the notches 111 is four in FIG. 3a; however, it is not limited to this as long as the supporting portion 12, the holding portion 13, and the engaging assembly 14 can be disposed on the base 11.

Figure 3C:
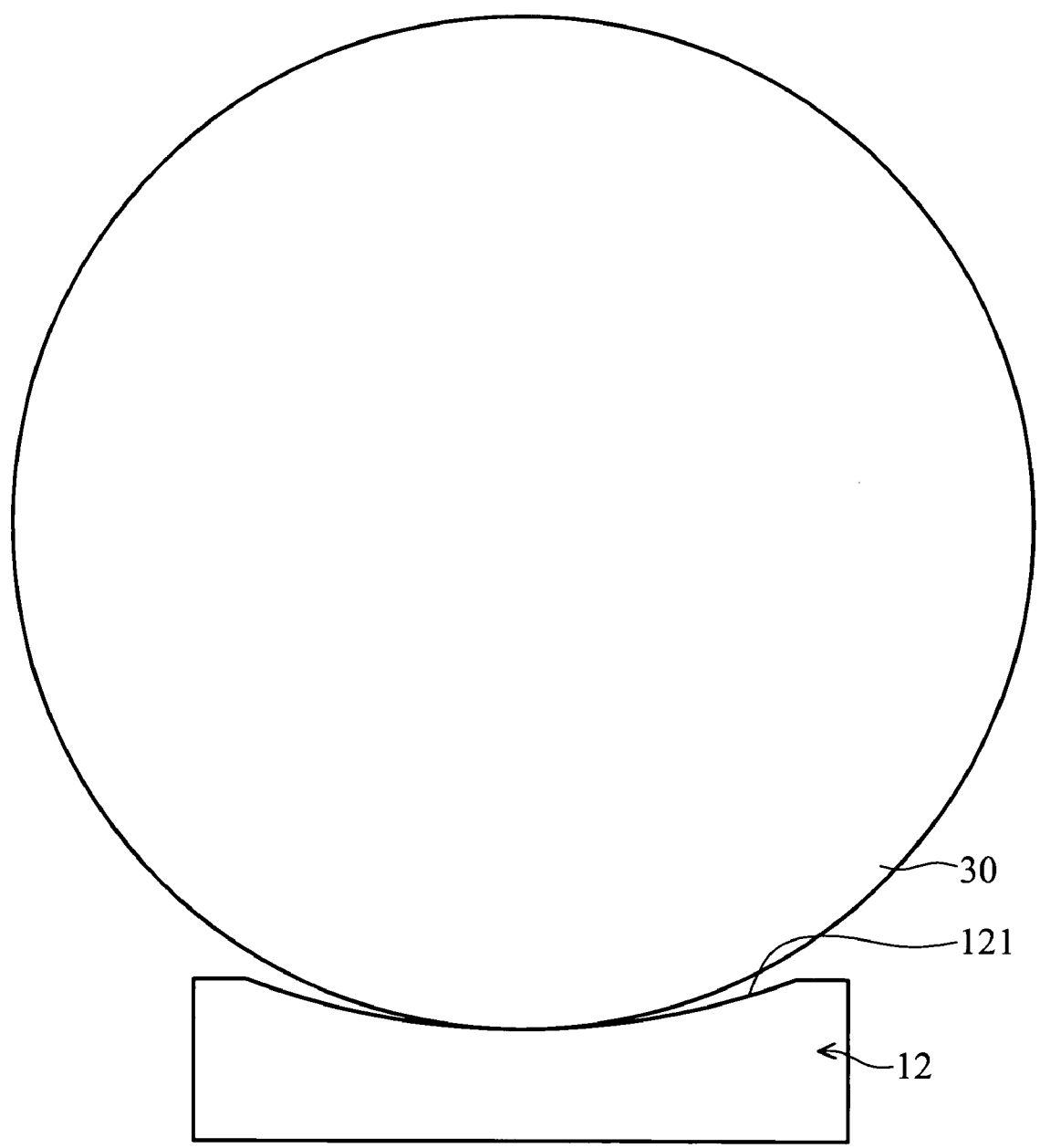

Each supporting portion 12 is disposed on an upper surface 11a of the base 11, and comprises a cambered surface 121 on which the lamp 30 is disposed. Note that the curvature of the cambered surface 121 is less than the curvature of the lamp 30 disposed thereon, as shown in FIG. 3c. Thus, the supporting portion 12 contacts the lamp 30 linearly so that the contact area therebetween is as small as possible.

Each holding portion 13 is disposed on the base 11, and corresponds to each supporting portion 12. The holding portion 13 comprises two rods 131 which are located at two sides of the corresponding supporting portion 12. Each rod 131 comprises a hook 132 that is substantially located at a center of the rod 131 and extends toward the base 11. Each hook 132 abuts the lamp 30 to fix the lamp 30 at the supporting portion 12.

Since the shape of the hooks 132 of the holding portion 13 is an inverted-"⌐⌐" shape, the lamp 30 is easily disposed on the supporting portion 12 via the hooks 132, but is not easily removed from the supporting portion 12 via the hooks 132. Additionally, since the hook 132 is substantially located at the center of the rod 131, the rod 131 above the hook 132 is easily moved when removing the lamp 30. Thus, the lamp 30 is conveniently removed due to such arrangement.

Figure 4A:
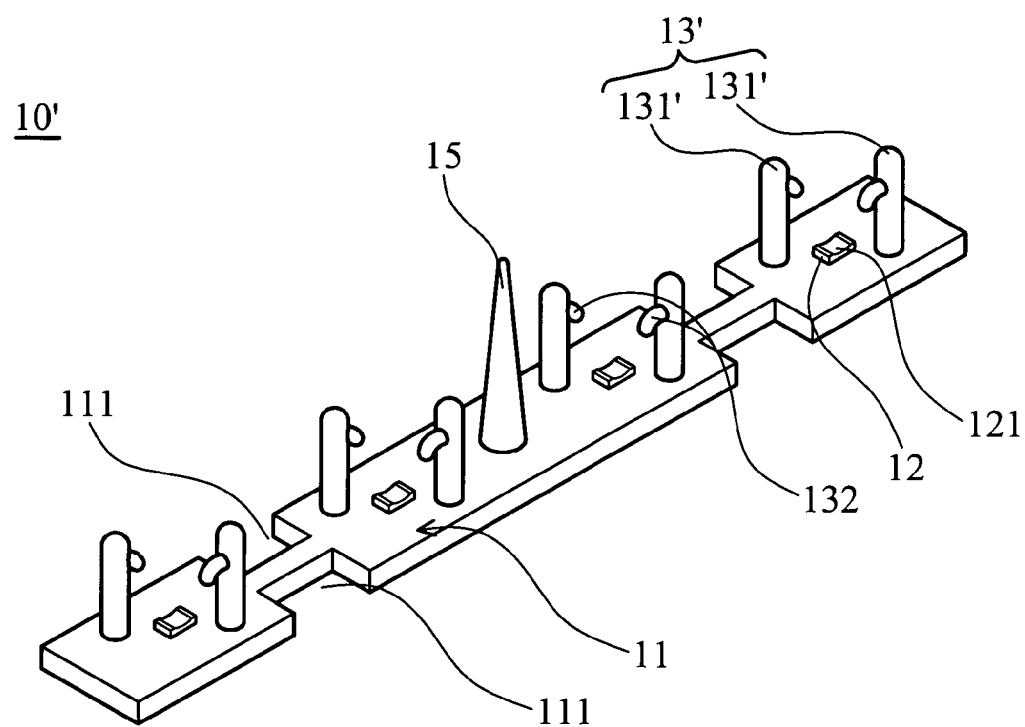
FIG. 4a is a schematic view of another embodiment of a lamp holder.
Figure 4B:
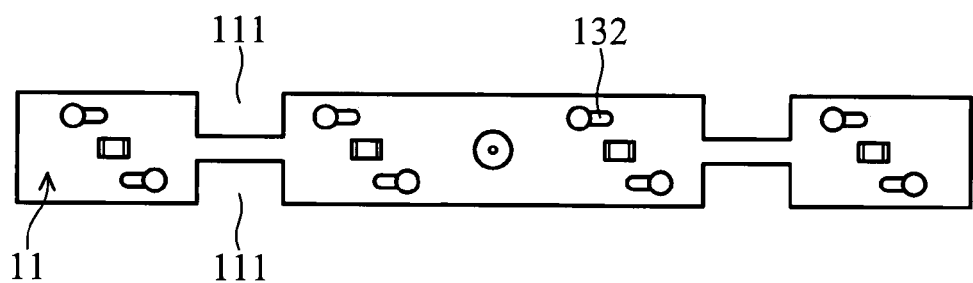

In FIG. 2b, the rods 131 of the same holding portion 13 are located on the same perpendicular plane; that is, the rods 131 of the same holding portion 13 have the same Y-axis coordinate. Alternatively, in view of light progress, the rods 131' of the same holding portion 13' are staggered, as shown in the backlight module 10' in FIGS. 4a and 4b. Thus, the light may not be nearly obstructed at the same perpendicular plane. Additionally, both the supporting portion 12 and the holding portion 13 may be integrally formed on the base 11. That is, the lamp holder 10 may be integrally formed into a single piece.

Figure 5:
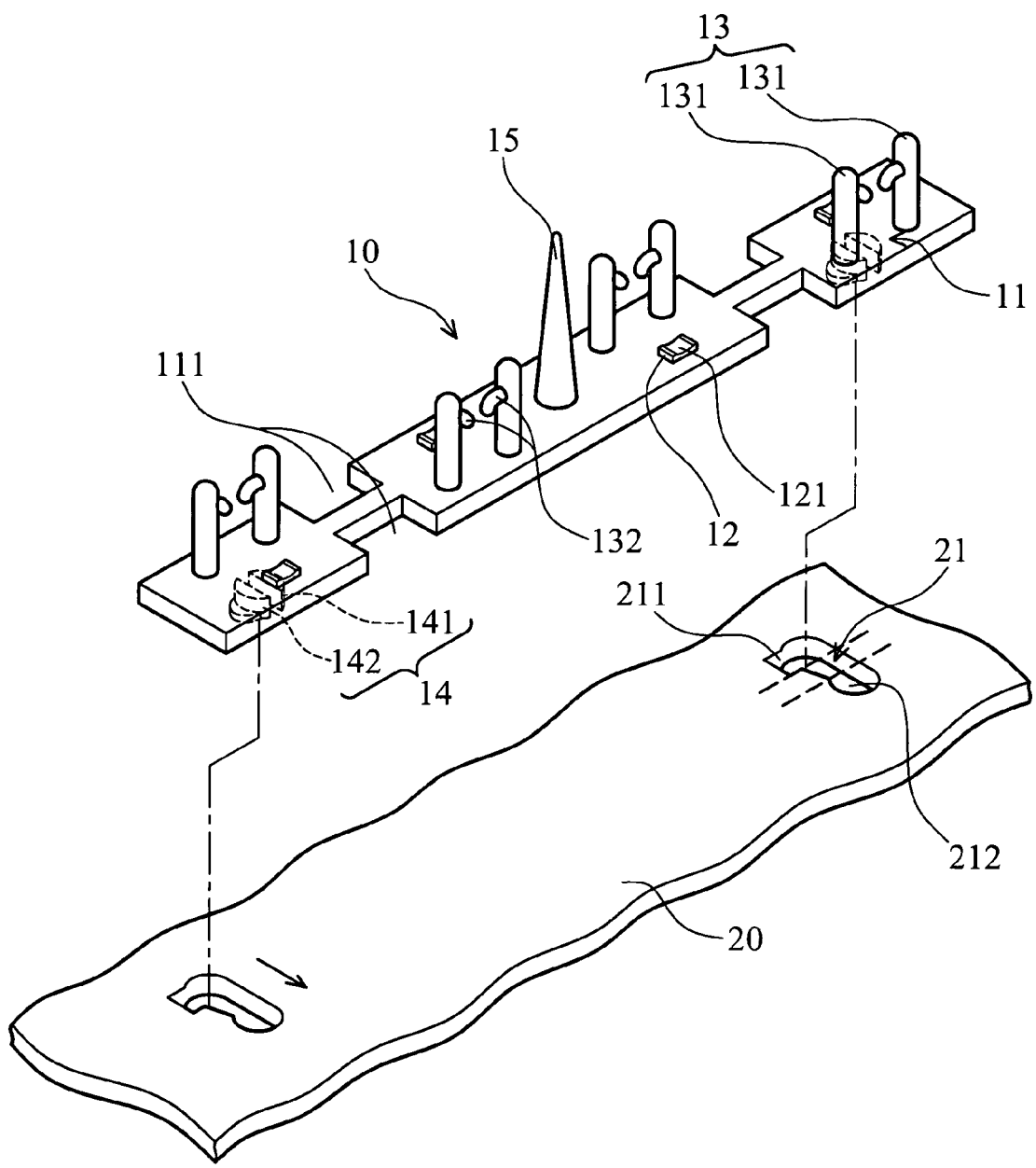
FIG. 5 is an exploded view of a back plate and the lamp holder in FIG. 2b.

Each engaging assembly 14 is disposed at a lower surface 11b of the base 11, and comprises a shaft 141 and a cantilever beam 142, as shown in FIG. 5. The back plate 20 comprises a hole 21 corresponding to the engaging assembly 14. The hole 21 comprises a large-radius portion 211 and a small-radius portion 212. To combine the lamp holder 10 with the back plate 20, the engaging assembly 14 enters the hole 21 via the large-radius portion 211. The engaging assembly 14 is then moved into the small-radius portion 212 along an arrow in FIG. 5. At this time, the shaft 141 and the cantilever beam 142 abuts the small-radius portion 212, respectively, so that the engaging assembly 14 engages the hole 21 at the small-radius portion 212 to fix the lamp holder 10 at the back plate 20.

As previously described, in this embodiment of the lamp holder, the supporting portion contacts the lamp linearly, and the hook of the holding portion contacts the lamp by one point. Thus, the contact area between the lamp and the lamp holder can be largely reduced, and the uniformity of the temperature of the lamp can be maintained due to less heat-loss. Furthermore, due to such arrangement, the light obstruction can be reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lamp holder for supporting a lamp, comprising:
   a base;
   a supporting portion disposed on the base, wherein the lamp is disposed on the supporting portion; and
   a holding portion, disposed on the base, comprising two rods, each of the two rods located at each opposite side of the supporting portion to fix the lamp on the supporting portion, wherein the supporting portion and the holding portion are separately disposed on the base, wherein each of the two rods comprises a hook abutting the lamp to fix the lamp.

2. The lamp holder as claimed in claim 1, wherein the hook is substantially located at a center of the rod.

3. The lamp holder as claimed in claim 1, wherein the hook extends toward the base.

4. The lamp holder as claimed in claim 1, wherein the rods are staggered.

5. The lamp holder as claimed in claim 1, wherein the supporting portion comprises a cambered surface contacting the lamp.

6. The lamp holder as claimed in claim 5, wherein the curvature of the cambered surface is less than the curvature of the lamp.

7. The lamp holder as claimed in claim 1, wherein the base comprises a plurality of notches.

8. The lamp holder as claimed in claim 1, wherein the supporting portion is integrally formed on the base.

9. The lamp holder as claimed in claim 1, wherein the holding portion is integrally formed on the base.

10. A backlight module comprising:
    a plurality of lamps; and
    a lamp holder comprising a base and a plurality of fixing members, wherein each fixing member comprises a supporting portion and a holding portion, the supporting portion and the holding portion are separately disposed on the base, the supporting portion is for supporting the corresponding lamp, and the holding portion comprises two rods, each of the two rods located at each opposite side of the supporting portion, wherein each of the two rods comprises a hook abutting the lamp to fix the lamp.

11. The backlight module as claimed in claim 10, wherein the supporting portion comprises a cambered surface contacting the corresponding lamp, and the curvature of the cambered surface is less than the curvature of the lamp.

12. The backlight module as claimed in claim 10, wherein the rods are staggered.

13. The backlight module as claimed in claim 10, wherein the hook is substantially located at a center of the rod.

14. The backlight module as claimed in claim 10, further comprising a back plate with a hole, wherein the lamp holder comprises an engaging assembly combined with the hole to fix the lamp holder at the back plate.

15. The backlight module as claimed in claim 14, wherein the hole comprises a small-radius portion and a large-radius portion, and the engaging assembly enters the hole via the large-radius portion and engages the hole at the small-radius portion.

16. The backlight module as claimed in claim 15, wherein the engaging assembly comprises a shaft and a cantilever beam abutting the small-radius portion, respectively, when the engaging assembly engages the hole at the small-radius portion.

17. The backlight module as claimed in claim 10, wherein the lamp holder is integrally formed.

18. The backlight module as claimed in claim 10, further comprising an additional lamp holder.

* * * * *